United States Patent [19]

Church et al.

[11] Patent Number: 5,983,203
[45] Date of Patent: Nov. 9, 1999

[54] COMPUTER IMPLEMENTED METHOD FOR PROCESSING DATA ITEMS FROM DIFFERENT SOURCES OF A COMMON BUSINESS ATTRIBUTE

[75] Inventors: Brian E. Church, North Falmouth; Joseph G. Ferra, Dover; Paul F. Mulligan, Hingham, all of Mass.

[73] Assignee: FMR Corp., Boston, Mass.

[21] Appl. No.: 08/775,363

[22] Filed: Jan. 3, 1997

[51] Int. Cl.$^6$ .................................................. G06F 17/28
[52] U.S. Cl. ............................................................ 705/35
[58] Field of Search .................................. 705/1, 35, 37, 705/36; 395/200.68, 7, 74, 885, 883

[56] References Cited

U.S. PATENT DOCUMENTS 5,274,547  12/1993  Zoffel et al. ............................ 364/408
5,557,780   9/1996  Edwards et al. ........................ 395/500

*Primary Examiner*—Gail O. Hayes
*Assistant Examiner*—Miles Horak
*Attorney, Agent, or Firm*—Fish & Richardson P.C.

[57] ABSTRACT

A computer implemented method for processing streams of data signals representing different data items of a common business attribute transmitted by a plurality of different vendors. The streams of data signals are transmitted to the computer by the vendors. Each one of the vendors transmits the data items in a different vendor associated data item format. A rules table is provided in the computer relating each of the vendors with such vendors associated data item format. The streams of data signals transmitted by the plurality of different vendors are stored in a memory. The vendors transmitting the streams of data signals are identified by the computer. The formats of the streams of data signals transmitted by each of the vendors are mapped by the computer in accordance with the rules table into a common predetermined format for the data items. The common format of the data items is stored in a computer memory. The computer compares a common one of the data items in the common format to determine a discrepancy in the data item provided by the vendors. After any determined discrepancy is resolved, the common one of the data items is stored in a database.

4 Claims, 2 Drawing Sheets

COMPUTER IMPLEMENTED METHOD FOR PROCESSING DATA ITEMS FROM DIFFERENT SOURCES OF A COMMON BUSINESS ATTRIBUTE

BACKGROUND OF THE INVENTION

This invention relates generally to computer implemented methods for processing data items of a business attribute and more particularly for processing data items from different sources of a common business attribute.

As is known in the art, many financial institutes, such as brokerage or investment firms, receive and report various types of financial information from a large number of businesses. For example, one business may be a publicly held corporation which issues equity instruments of various kinds, such as common and preferred stock and/or debt instruments of various types, such as bonds of various types. Another business may be a government which issues debt instruments such as bonds, notes and/or bills. Still another business may be a mutual fund which makes distributions from time to time. Information providers, i.e., vendors, may provide financial information relating to these businesses to its clients. This information, herein collectively referred to a business attribute, may relate to a financial instrument or a business action. For example, in the case of a financial instrument, a business attribute may include the instrument's annual yield, annual dividend, maturity date, CUSIP, etc., and in the case of a business action may include an identification of the business, i.e., company, corporation, mutual fund or government reporting the business action, the date a quarterly dividend is to be paid, the amount of the quarterly dividend, and the record ownership date for payment of the quarterly dividend.

As is also known in the art, the vendors may report this financial information to the brokerage or investment firm electronically through modems. Further, each vendor may electronically provide its information in a format unique to that vendor. Further, some of the vendors may use different terminology, format or style for the same data item. Also, there may be differences in the data for the same data item. In order to resolve these differences, or discrepancies, significant human intervention, at significant cost and delay, is required to distinguish between genuine data discrepancies and mere differences in terminology, format or style.

SUMMARY OF THE INVENTION

In accordance with the present invention, a computer implemented method for processing, including validating and resolving data discrepancies in, streams of data signals representing different data items of a common business attribute transmitted by a plurality of different vendors is provided. The streams of data signals are transmitted to the computer by the vendors. Each one of the vendors transmits the data items in a different vendor associated data item format. A rules table is provided in the computer relating each of the vendors with such vendors associated data item format. The streams of data signals transmitted by the plurality of different vendors are stored in a memory. The vendors transmitting the streams of data signals are identified by the computer. The formats of the streams of data signals transmitted by each of the vendors are mapped by the computer in accordance with the rules table into a common predetermined format for the data items. The common format of the data items is stored in a computer memory. The computer compares each common one of the data items in the common format to determine a discrepancy in the data item. After any determined discrepancy is resolved, each common one of the data items is stored in a database. The data in the database is adapted for use in providing printed or electronic reports to clients.

In accordance with another feature of the invention, the computer implemented method includes the steps of detecting any discrepancy, processing the detected discrepancy in accordance with a predetermined discrepancy rule to produce a business validated data item for storage in the database.

With such computer implemented method, significant human intervention time and cost are reduced in the process of evaluation, translating and comparing the data obtained from the different vendors. Thus, a computer implemented method is provided for producing a report of business attributes after any discrepancy in the data items from the vendors has been resolved.

BRIEF DESCRIPTION OF THE DRAWING

Other features of the invention, as well as the invention itself, may be more fully understood with reference to the following detailed description taken together with the accompanying drawings, in which.

DESCRIPTION OF THE PREFERRED EMBODIMENTS

Figure 1:
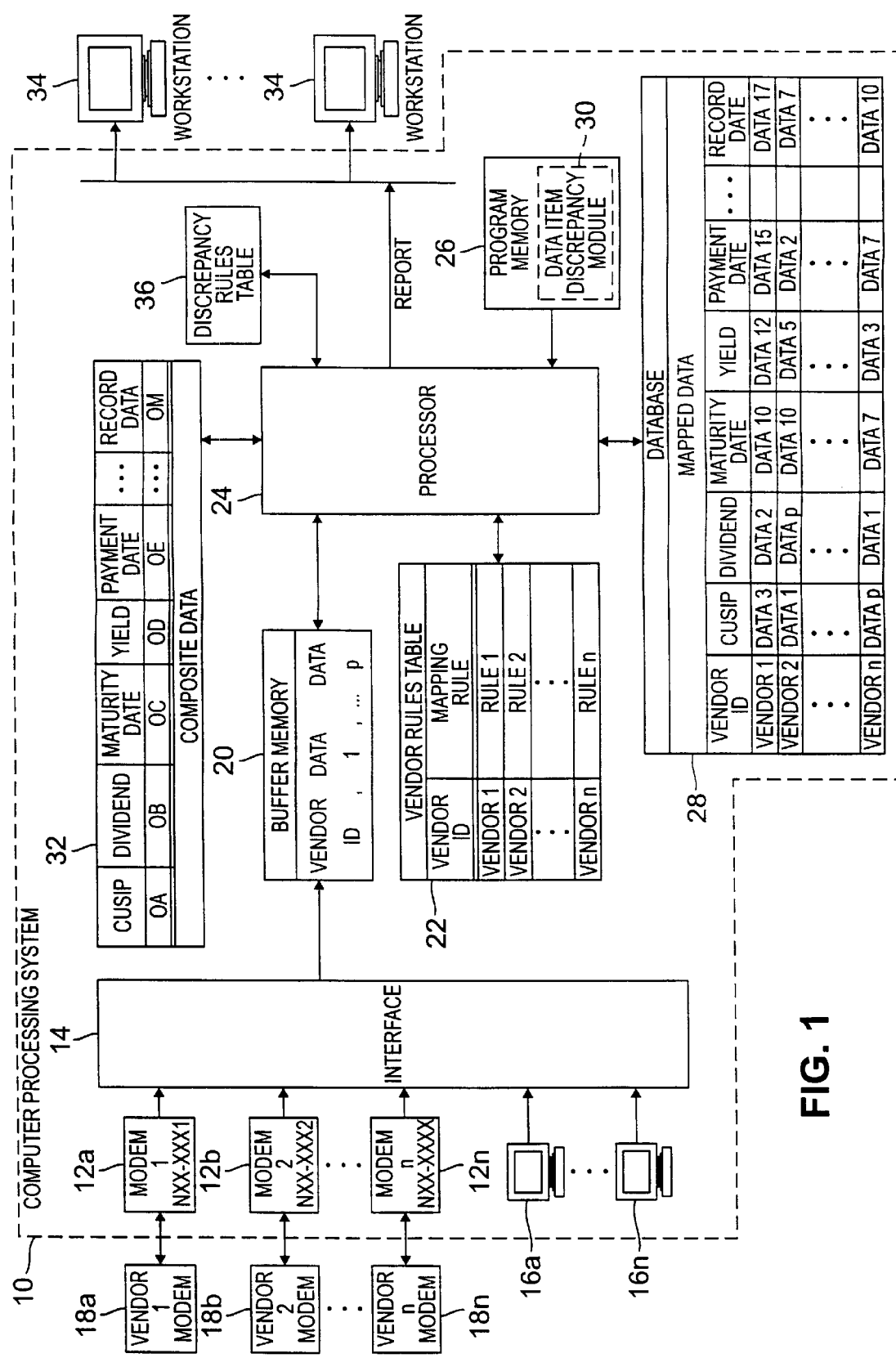
FIG. 1 is a block diagram of a computer system adapted to execute a method for processing data items of a business attribute from different sources of a common business attribute.

Referring now to FIG. 1, a computer processing system 10 is shown adapted to producing a report, either printed or electronic, of business attribute from data items transmitted to it from a plurality of different financial information vendors (i.e., financial information service providers). The computer processing system 10 is here owned or leased by a brokerage or investment firm (i.e., a service subscriber). The computer system 10 includes a plurality of modems 12a–12n each one connected to a corresponding one of the different vendors though a dedicated telephone line. Thus, in this example, VENDOR 1 is connected to subscriber modem 12a via a modem 18a and a telephone line having telephone number NXX-XXX1. In like manner, VENDORs 2-n are connected to subscriber modems 12b–22n via modems 18b–18n and telephone lines having telephone numbers NXX-XXX2 through NXX-XXXn, respectively, as indicated. Each vendor modem 18a–18n provides a serial stream of data signals to the computer system 10. The streams of data signals transmitted by the vendors represent different data items (i.e., maturity date, dividend, etc.) of a common business attribute. As will be described in more detail, each one of the vendors transmits the data items in a different vendor associated data item format.

The outputs of the subscriber modems 12a–12n are connected to input ports of the computer system input interface 14, as shown. Also coupled to input ports of the interface 14 are operator attendant computer terminals 16a–16m. These computer terminals 16a–16m enable operators to manually input data signals representing different data items of common business attributes. The streams of data signals transmitted by the plurality of different vendors via the modems 18a–18n are received by modems 12a–12n, respectively, and are then stored serially into a buffer memory 20. Each vendor transmits the data items of the same business attribute in a different format. For example, if the vendors transmit the data items in comma delineated format, the serial stream of data items in the general case may be represented by:

Vendor Identification (ID), DATA1, DATA2, . . . , DATAp.

It should be understood, however, and assuming all vendors transmit as its first data item, DATA1, a VENDOR ID, that VENDOR 1 may transmit as the second data item, DATA1, maturity date, as the third data item, DATA2, dividend, as the fourth data item, DATA3 CUSIP, etc,; whereas VENDOR n may transmit as the second data item, DATA1, CUSIP, as the third data item, DATA2, yield, as the fourth data item, DATA3 payment date, etc. Further, some of the vendors may use different terminology or style for the same data item. Also, there may be differences in the data for the same data item.

Figure 2:
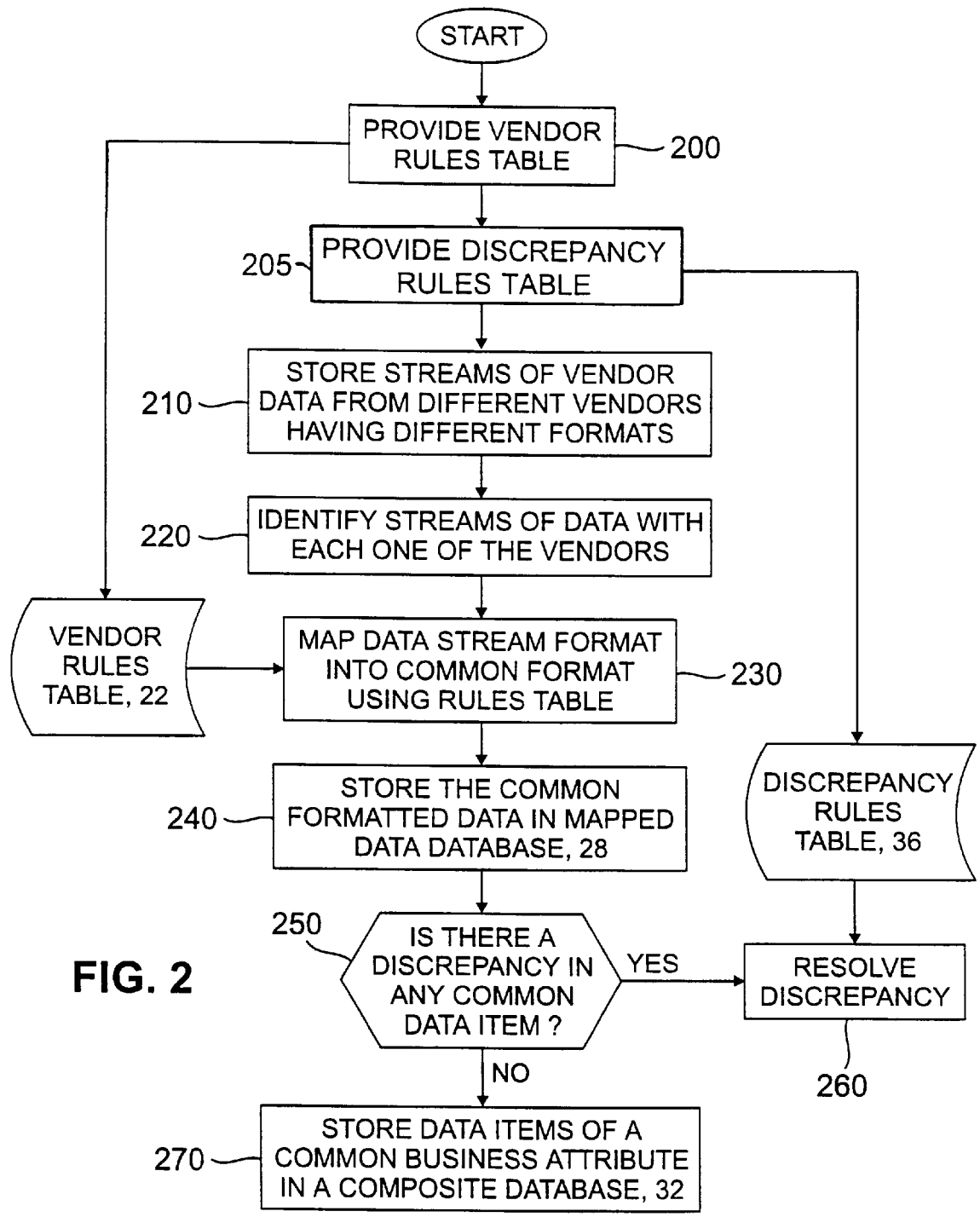
FIG. 2 is a flow diagram of the computer implemented method for processing data items of a business attribute from different sources of a common business attribute.

Referring also to FIG. 2, a vendor format rules table is stored in a memory 22 (Step 200) relating each of the vendors with such vendors associated data item format, terminology or style. Thus, the rules table 22 provides an indication that, in the example above, all vendors transmit as its first data item, DATA1, a VENDOR ID, that VENDOR 1 transmits as the second data item, DATA1, maturity date, as the third data item, DATA2, dividend, as the fourth data item, DATA3 CUSIP, etc,; whereas VENDOR n transmits as the second data item, DATA1, CUSIP, as the third data item, DATA2, yield, as the fourth data item, DATA3 payment date, etc.

The streams of data signals stored in the buffer memory 20 are read by the processor 24 (Step 210). The processor 24 is here a UNIX type server. A computer implemented method for processing the data items of a business attribute from the different vendors is stored as a computer in a program memory 26. Here the computer program is in C Language. The processor 24, in accordance with the program stored in the program memory 26, a flow diagram of such program being shown in FIG. 2, identifies the vendor from the VENDOR ID read from the buffer memory 20 (Step 220). That is, the vendors which transmit the data items are identified by the computer system 10. The processor 24 in executing the program stored in the program memory 26, maps the streams of data signals transmitted by each of the vendors in accordance with the rules table stored in memory 22 into a common predetermined format for the data items which are stored in memory 28 (Step 230). Here, for example, as shown in FIG. 1, the common predetermined format is:

VENDOR ID, CUSIP, DIVIDEND, MATURITY DATE, YIELD, PAYMENT DATE, . . . RECORD DATE.

The common format of the data items is stored in the computer mapped data memory 28, or database (Step 240). The processor 24, in executing a data item comparison module 30 with the program memory 26, compares a common one of the data items stored in the mapped data database 28 (i.e., in the common format) to determine whether there is a discrepancy in any one of the data items provided by the vendors (Step 250). Thus, for example, the data in the mapped database 28 for the CUSIP data item for each of the vendors are compared. Likewise, each of the other data items in mapped database 28, such as for example, maturity date, dividend, etc., are compared. If the processor 24 indicates there is no discrepancy in the data for each of the data items, the corporate attribute is stored in a composite database 32. On the other hand, if a discrepancy is detected by the processor 24 in any data item, i.e., VENDOR 1 reports that company XYZ declare a next quarter dividend of 30 cents and VENDOR 3 reports that company XYZ will declare a next quarter dividend of 33 cents, the discrepancy detected by the processor 24 is either: (1) resolved by the computer system 10; or, (2) called out and the indicated discrepancy which is sent to workstation 34 as a workflow item for further processing by the operator utilizing the workstation 34, for example, by calling the XYZ company.

More particularly, when the processor 24 detects the discrepancy, the processor 24 uses a set of previously stored discrepancy rules (Step 205) stored in a discrepancy rules table 36 to process the discrepancy. For example, one rule may state that "majority rules"; that is, if two vendors provide the exact same data but a third vendor provides different data for the same data item, the data item is presumed to be the data from the two vendors having the same data. Another rule states that for a particular data item, if two vendors provide different data, a specified one of the vendors having previously established a high degree of reliability for that data item compared with the other vendors reliability, is presumed to have provided the correct data for that item. Other rules may be stored in the discrepancy rules table 36. Thus, the processor 24 processes the detected discrepancy in accordance with a predetermined discrepancy rule stored in memory 36 to produce a business validated data item. That is, the discrepancy may be resolved by considering such things as the historical integrity of VENDOR 1 and VENDOR 3. It is noted that as operators resolve these discrepancies, information is learned and used to update and improve upon the rules stored in the discrepancy rules table 36.

The discrepancy, thus being resolved either by the processor 24 or operator (Step 260), in this example, the correct dividend amount declared by company XYZ, together with the other data items having no discrepancy, are stored in the composite data memory 32 (Step 270). That is, after any determined discrepancy is resolved, each common one of the data items is stored in a database 32. Reports of the corporate attribute recorded, i.e., stored in the composite database 32, are available for reporting, either printed or electronically, to clients of the service subscriber.

Other embodiments are within the spirit and scope of the appended claims.

What is claimed is:

1. A computer implemented method for processing streams of data signals transmitted by different vendors and representing different conflicting data items of a common business attribute, comprising:

providing rules that define how to derive a resulting data item of the common business attribute from the different conflicting data items, the rules including a rule that gives preference to a data item provided by a vendor that is identified as being more reliable with respect to that data item;

storing the streams of data signals transmitted by the plurality of different vendors in a memory;

identifying the vendors transmitting the streams of data signals;

comparing the conflicting data items, in a processor, to identify the conflict and resolve it according to the rules.

2. The method recited in claim 1 including the step of storing the resulting data item in a database.

3. The method of claim 1 wherein one of the rules is based on historical integrity of one of the vendors.

4. The method of claim 1 wherein the rules are updated based on experience with the vendors.

* * * * *